United States Patent
Srinivasan et al.

(10) Patent No.: US 9,813,362 B2
(45) Date of Patent: *Nov. 7, 2017

(54) FRAMEWORK FOR SCHEDULING PACKETS WITH MULTIPLE DESTINATIONS IN A VIRTUAL OUTPUT QUEUE NETWORK SWITCH

(71) Applicant: Oracle International Corporation, Redwood City, CA (US)

(72) Inventors: Arvind Srinivasan, San Jose, CA (US); Shimon Muller, Sunnyvale, CA (US)

(73) Assignee: Oracle International Corporation, Redwood Shores, CA (US)

(*) Notice: Subject to any disclaimer, the term of this patent is extended or adjusted under 35 U.S.C. 154(b) by 276 days.

This patent is subject to a terminal disclaimer.

(21) Appl. No.: 14/572,428

(22) Filed: Dec. 16, 2014

(65) Prior Publication Data

US 2016/0173365 A1     Jun. 16, 2016

(51) Int. Cl.
*H04L 12/879* (2013.01)
*H04L 12/931* (2013.01)
*H04L 12/935* (2013.01)

(52) U.S. Cl.
CPC .......... *H04L 49/901* (2013.01); *H04L 49/201* (2013.01); *H04L 49/3018* (2013.01)

(58) Field of Classification Search
CPC ... H04L 49/901; H04L 49/65; H04L 49/3018; H04L 49/30; H04L 49/201; H04L 49/20
USPC ................. 370/412, 401, 413, 390
See application file for complete search history.

(56) References Cited

U.S. PATENT DOCUMENTS

| | | | |
|---|---|---|---|
| 6,044,418 A | 3/2000 | Muller | |
| 6,625,121 B1 | 9/2003 | Lau | |
| 6,674,721 B1 | 1/2004 | Dittia | |
| 6,760,331 B1* | 7/2004 | Moussavi | H04L 49/201 370/390 |
| 6,959,002 B2 | 10/2005 | Wynne | |
| 7,046,687 B1* | 5/2006 | Brown | H04L 45/7453 370/412 |
| 7,274,691 B2 | 9/2007 | Rogers | |
| 7,391,786 B1 | 6/2008 | Prasad | |
| 7,583,598 B2 | 9/2009 | Kamiya | |

(Continued)

*Primary Examiner* — Kwang B Yao
*Assistant Examiner* — Syed M Bokhari
(74) *Attorney, Agent, or Firm* — Park, Vaughan, Fleming & Dowler LLP

(57) ABSTRACT

A system for communicating a multi-destination packet through a network switch fabric is described. The system receives the multi-destination packet at an input port of the network switch fabric, wherein the multi-destination packet is directed to multiple output ports, and wherein the network switch fabric has a virtual output queue (VOQ) architecture, wherein each input port maintains a separate VOQ for each output port. The system sends the multi-destination packet by inserting the multi-destination packet into VOQs associated with the multiple output ports. While inserting the multi-destination packet in each VOQ, if the VOQ is empty, the system inserts the multi-destination packet at a head of the VOQ. Otherwise, if the VOQ is not empty and if the VOQ contains an end of a last complete packet received by the VOQ, the system inserts the multi-destination packet into the VOQ at the end of the last complete packet.

21 Claims, 4 Drawing Sheets

(56) References Cited

U.S. PATENT DOCUMENTS

| | | | |
|---|---|---|---|
| 8,040,901 B1 | 10/2011 | Kompella | |
| 8,081,646 B1 * | 12/2011 | Bishop | H04L 47/10 370/413 |
| 8,767,752 B1 | 7/2014 | Tripathi | |
| 2002/0176431 A1 | 11/2002 | Golla | |
| 2004/0131069 A1 | 7/2004 | Ling | |
| 2005/0129043 A1 | 6/2005 | Konda | |
| 2005/0195845 A1 | 9/2005 | Mayhew | |
| 2006/0018329 A1 * | 1/2006 | Nielsen | H04L 47/52 370/401 |
| 2006/0098675 A1 | 5/2006 | Okuno | |
| 2007/0253439 A1 | 11/2007 | Iny | |
| 2012/0093034 A1 | 4/2012 | Kamath | |
| 2012/0213075 A1 | 8/2012 | Koie | |
| 2013/0287017 A1 | 10/2013 | Chen | |
| 2014/0161135 A1 * | 6/2014 | Acharya | H04L 47/263 370/412 |
| 2015/0098337 A1 | 4/2015 | Enkovaara | |
| 2015/0256480 A1 | 9/2015 | Tripathi | |
| 2016/0191406 A1 | 6/2016 | Xiao | |

* cited by examiner

FRAMEWORK FOR SCHEDULING PACKETS WITH MULTIPLE DESTINATIONS IN A VIRTUAL OUTPUT QUEUE NETWORK SWITCH

RELATED APPLICATIONS

This application is related to pending U.S. patent application Ser. No. 14/572,431 filed on the same day as the instant application, entitled "Scheduling Packets with Multiple Destinations in a Virtual Output Queue Network Switch" by inventors Arvind Srinivasan and Shimon Muller.

BACKGROUND

High-performance computing systems often include large numbers of servers interconnected by a network switch fabric that is responsible for moving packets among the servers. Each of these servers can run multiple virtual machines (VMs) and associated virtualized applications, and the network packet streams generated by these servers are typically directed to different resources that the VMs and associated applications need to access. Hot spots and associated network congestion frequently arise in such network switch fabrics depending on the traffic patterns of the packet streams and how the switch fabric is configured.

"Multicast packets" or "broadcast packets," which are sent from a single source to multiple destinations, are a major contributor to such network congestion. (We refer to such packets as "multi-destination packets.") Whenever a multi-destination packet is sent across a network switch fabric, traffic multiplication occurs. For example, a multi-destination packet entering a switch port is typically replicated to all or a subset of the output ports. This replication greatly reduces the amount of bandwidth that is available to transfer other packets through the switch fabric, thereby adversely affecting the performance of other packet streams.

Hence, what is needed is a technique for communicating multi-destination packets through a switch fabric without adversely affecting other packet streams.

SUMMARY

The disclosed embodiments relate to a system for communicating a multi-destination packet through a network switch fabric with a plurality of input and output ports. During operation, the system receives the multi-destination packet at an input port of the network switch fabric, wherein the multi-destination packet is directed to multiple output ports, and wherein the network switch fabric has a virtual output queue (VOQ) architecture, wherein each input port maintains a separate VOQ for each output port. Next, the system sends the multi-destination packet from the input port to the multiple output ports by inserting the multi-destination packet into VOQs associated with the multiple output ports. While inserting the multi-destination packet in each of the VOQs, the system performs the following operations. If the VOQ is empty, the system inserts the multi-destination packet at a head of the VOQ. If the VOQ is not empty and if the VOQ contains an end of a last complete packet received by the VOQ, the system inserts the multi-destination packet into the VOQ at the end of the last complete packet.

In some embodiments, while inserting the multi-destination packet at the end of the last complete packet, the system examines a next pointer at an end of the last complete packet. If the next pointer is NULL, which indicates that the end of the last complete packet is also at an end of the VOQ, the system inserts the multi-destination packet at the end of the VOQ. If the next pointer is not NULL, which indicates that the end of the last complete packet points to a new packet, the system performs an atomic operation that sets a next pointer at the end of the multi-destination packet to point to the new packet, and also sets the next pointer at the end of the last complete packet to point to the multi-destination packet.

In some embodiments, while inserting the multi-destination packet in each of the VOQs, if a VOQ is empty, the system inserts the multi-destination packet at a head of the VOQ.

In some embodiments, the input port includes a memory for storing buffers for VOQs, wherein each buffer contains a portion of a packet or an entire packet, and wherein each buffer includes a next pointer that points to either a next buffer in a packet or a next packet in the VOQ.

In some embodiments, buffers are allocated from the memory to VOQs as needed, and buffers are freed from VOQs when they are no longer needed.

In some embodiments, each VOQ includes: (1) a head pointer that points to a first buffer located at a head of the VOQ, wherein the first buffer is next to be sent to the output queue; (2) a tail pointer that points to a last buffer located at a tail of the VOQ, wherein the last buffer is the last buffer to be added to the VOQ; and (3) a last-complete-packet pointer that points to the end of the last complete packet received by the VOQ.

In some embodiments, the multi-destination packet is inserted into one VOQ at a time, so that after the multi-destination packet is read out of a VOQ and is sent to a corresponding output port, the multi-destination packet is inserted in another VOQ until the multi-destination packet is sent to all of the multiple output ports.

DETAILED DESCRIPTION

Overview

Figure 1:
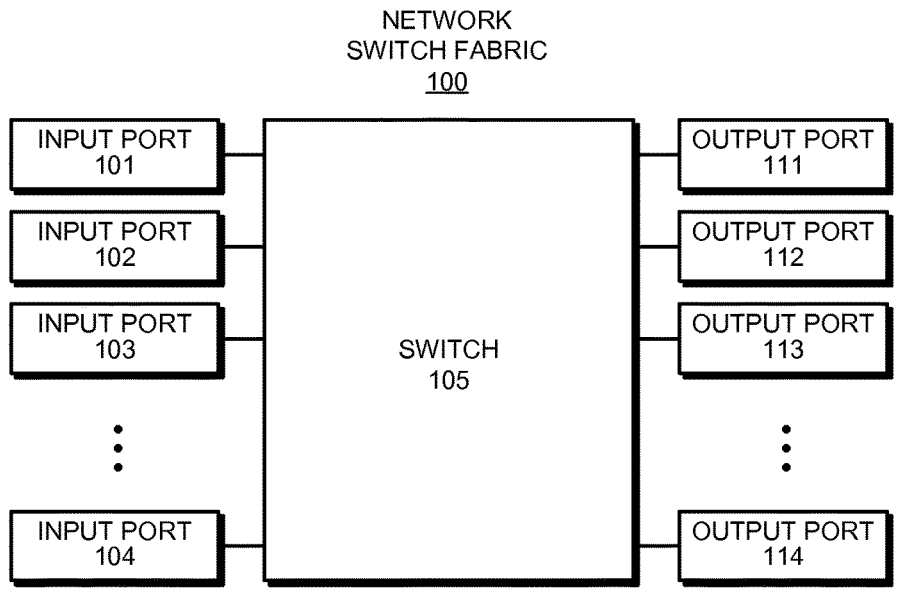
FIG. 1 illustrates a network switch fabric in accordance with the disclosed embodiments.

In high-performance computing systems, a network switch fabric is commonly used to move packets between servers. With servers running multiple virtual machines (VMs) and associated virtualized applications, network packet streams from a server tend to be associated with a number of different services that each VM and its applications seek to access. Depending on the traffic patterns and how the switch fabric is configured, network congestion can arise at various locations in the network switch fabric.

As mentioned above, multi-destination packets, which can include multicast packets or broadcast packets, are a major contributor to network congestion. A multi-destination packet that enters an input port of a switch fabric is replicated to all or a subset of the output ports, which can cause over-subscription and associated congestion. Because of the way traffic fluctuates in a network, it is not possible to completely eliminate this performance problem. However, a number of techniques can be used to optimize the performance of a network switch fabric while communicating multi-destination packets.

For example, the system can provide independent VOQs for multi-destination packets. This does not actually solve the bandwidth problem, but it can facilitate non-blocking behavior between unicast packets and multi-destination packets. Also, this technique effectively limits the total number of multi-destination packets that can be present in a switch at any point in time, which can reduce congestion. Moreover, this technique is typically used in Ethernet switches because packets can be dropped more easily than in Infiniband switches. In contrast, this technique does not work well for Infiniband switches, because packets cannot be dropped and the Infiniband protocol also relies on credit exchanges. Note that providing separate VOQs for multi-destination packets complicates the process of accounting for credits because the system needs to reserve credits for multi-destination packets only. This reduces the number of credits that are available for unicast packets, which impedes the flow of unicast packets through the switch.

Another technique for dealing with multi-destination packets is to provide higher bandwidth on the read-side of the packet buffer. This technique is practical for low-speed networks (e.g., 1G-10G networks) with low radix switches because it is possible to increase the read-side bandwidth in such systems with a higher speed internal clock. However, this technique is not practical for high-speed networks (e.g., 100G+) and high radix switches because internal clock speeds are already fast and cannot be increased.

The disclosed embodiments handle a multi-destination packet by scheduling the multi-destination packet for one VOQ at a time. During processing of a multi-destination packet, when the multi-destination packet is read out of a VOQ, the next VOQ for the destination list will get scheduled. This process is repeated until all of the output ports for the multi-destination packet are served. At this point, the multi-destination packet is freed and its associated credits are released.

The disclosed embodiments also provide a number of techniques for determining an order in which a multi-destination packet is sent to the output ports, and for inserting a multi-destination packet into a VOQ. These techniques are described in more detail below. However, we first describe the structure of the network switch fabric.

Network Switch Fabric

FIG. 1 illustrates an exemplary network switch fabric 100 in accordance with the disclosed embodiments. Network switch fabric 100 includes a switch 105, which can be used to send packets between a number of input ports 101-104 and a number of output ports 111-114. Network switch fabric 100 is used to send packets between various components within a computer system, including but not limited to servers, memories, storage devices and external interfaces.

Switch 105 can generally include any type of switch that can be used to send packets from input ports 101-104 to output ports 111-114. For example, switch 105 can comprise a crossbar switch that can be configured to simultaneously send packets from each input to each possible output. Alternatively, switch 105 can comprise a multi-stage switch having multiple stages of switching elements. Moreover, note that network switch fabric 100 can generally include any number of input ports and any number of output ports.

In an exemplary embodiment, network switch fabric 100 includes 42 input ports and 42 output ports.

Figure 2:
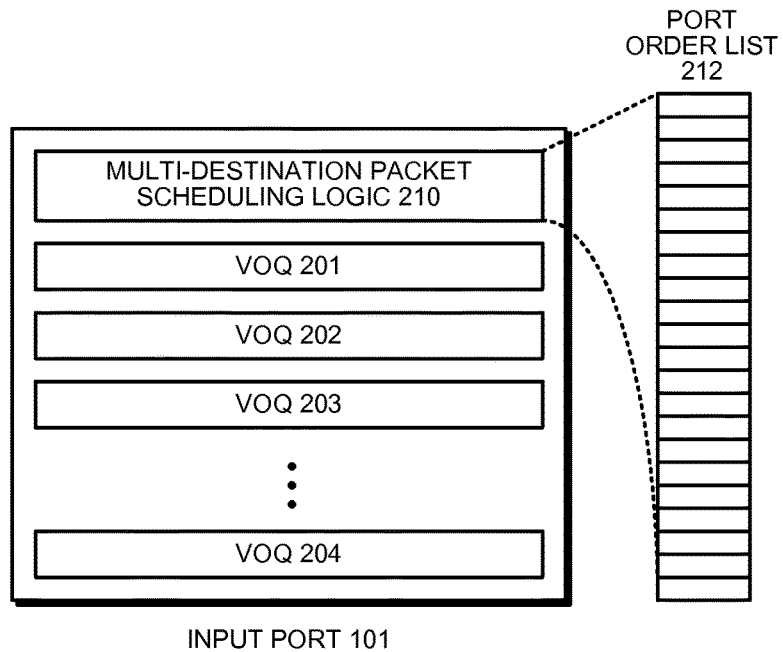
FIG. 2 illustrates an input port in accordance with the disclosed embodiments.

Network switch fabric 100 has a virtual output queue (VOQ) architecture, in which each input port maintains a separate VOQ for each output port. For example, FIG. 2 illustrates an exemplary input port 101 for network switch fabric 100 in accordance with the disclosed embodiments. Note that input port 101 maintains a number of VOQs 201-204, wherein each VOQ 201-204 is associated with a different output port. In this way, queuing only takes place at the input ports 101-104.

Input port 101 also includes multi-destination packet scheduling logic 210, which is responsible for scheduling multi-destination packets to be inserted into VOQs. During this scheduling process, multi-destination packet scheduling logic 210 makes use of a port order list 212 that specifies an ordering of the output ports to be used while scheduling a multi-destination packet. Port order list 212 is described in more detail below with reference to FIGS. 3-5.

Virtual Output Queue

Figure 3:
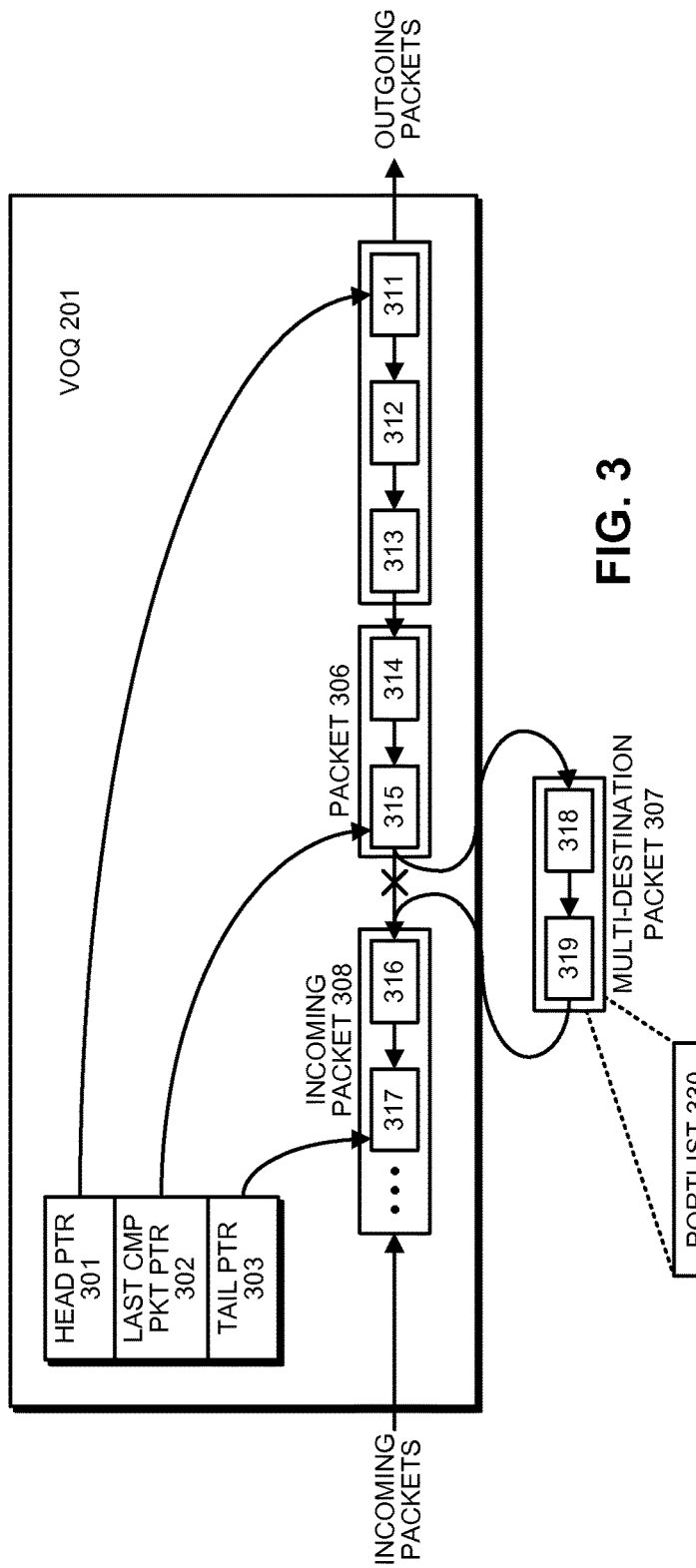
FIG. 3 illustrates a VOQ in accordance with the disclosed embodiments.

FIG. 3 illustrates the structure of a virtual output queue (VOQ) 201 within an input port 101 in accordance with the disclosed embodiments. VOQ 201 is implemented as a linked list comprising buffers 311-317, wherein each buffer contains a portion of a packet or an entire packet, and wherein each buffer includes a next pointer that points to either a next buffer in a packet or a next packet in the VOQ. Note that buffers 311-317 are allocated from a common memory pool associated with input port 101, and this common memory pool is shared by all of the VOQs 201-204 associated with input port 101. The fact that all of the buffers reside in a common memory pool simplifies the process of moving packets between VOQs because moving a packet simply involves changing the pointers associated with the buffers that comprise the packet; the buffers themselves do not actually need to be moved.

VOQ 201 maintains a set of pointers including a head pointer (HEAD PTR) 301, a last-complete-packet pointer (LAST CMP PKT PTR) 302 and a tail pointer (TAIL PTR) 303. Head pointer 301 points to a buffer 311 at the head of VOQ 201, wherein buffer 311 will be the next buffer to be sent from VOQ 201 to an output queue. Tail pointer 303 points to buffer 317 at the tail of VOQ 201, wherein buffer 317 is the last buffer to be inserted into VOQ 201. If an incoming packet 308 is in the process of being inserted into VOQ 201, buffer 317 can possibly contain a middle portion of the packet that is being inserted. On the other hand, if no packet is presently being inserted into VOQ 201, buffer 317 contains an end of a last packet to be inserted into VOQ 201.

Last-complete-packet pointer 302 points to the end of the last complete packet that was inserted into VOQ 201. As illustrated in FIG. 3, a multi-destination packet 307 comprising buffers 318-319 can be inserted into VOQ 201 at the end of this last complete packet. The process of inserting a multi-destination packet into a VOQ is described in more detail below with reference to the flow chart in FIG. 5.

Each multi-destination packet includes a portlist 330, which comprises a bit vector having a bit for each output port. A bit that is set in portlist 330 indicates that the multi-destination packet 307 still needs to be inserted into a VOQ for an output port associated with the bit. Note that portlist 330 is used to keep track of which VOQs multi-destination packet 307 still needs to visit. The use of portlist 330 is described in more detail below with reference to the flow chart in FIG. 4.

Processing a Multi-Destination Packet

Figure 4:
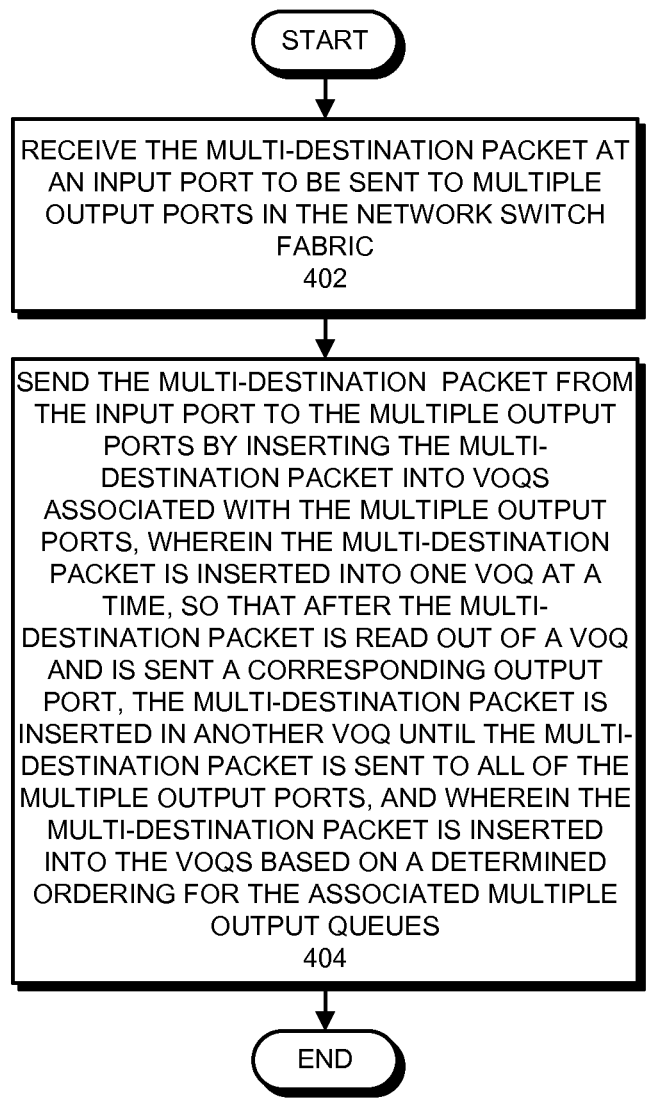
FIG. 4 presents a flow chart illustrating how a multi-destination packet is sent to multiple output ports in accordance with the disclosed embodiments.

FIG. 4 presents a flow chart illustrating how a multi-destination packet is sent to multiple output ports in accordance with the disclosed embodiments. At the start of this process, the system receives a multi-destination packet at an input port that is directed to multiple output ports (step 402). Next, the system sends the multi-destination packet from the input port to the multiple output ports by inserting the multi-destination packet into VOQs associated with the multiple output ports (step 404). During this process, the multi-destination packet is inserted into one VOQ at a time, so that after the multi-destination packet is read out of a VOQ and is sent to a corresponding output port, the multi-destination packet is inserted in another VOQ. This process is repeated until the multi-destination packet is sent to all of the multiple output ports. Note that the multi-destination packet can be inserted into the VOQs based on a determined ordering for the multiple output queues, which can dramatically affect performance as is described in more detail below.

Note that data movement within an Infiniband™ network switch fabric depends on credits, and a lack of credits can potentially stall a packet in a VOQ until additional credits become available to move the packet. For example, an output port will only schedule an input port if it has sufficient credits to move a packet from the input port. This means that a VOQ will only be able to move its packet to a corresponding output port if the output port schedules it. The scheduling can be based on a number of factors, such as availability of credits, priority among input ports, and speed of the output port. Hence, when a multi-destination packet is scheduled among a set of output ports, a slower output port can potentially stall the multi-destination packet from moving it to another output port that is faster, which can cause performance problems for the multi-destination packet.

These performance problems can be reduced by scheduling the multi-destination packet among the VOQs based on an ordering that optimizes performance. This scheduling can be performed through a technique that uses the port order list 212 maintained for the input port 101, and a portlist 330 maintained for each destination packet. Recall that a port order list comprises a list of output ports arranged in a specific order, wherein the specific order can be updated based on various policies as is described in more detail below. Also, recall that a portlist can be implemented as a bit vector having a bit for each output port, wherein a bit being set indicates that the multi-destination packet still needs to be sent to an associated output port.

When a multi-destination packet is first received at an input port, a classification engine generates an initial portlist for the multi-destination packet that specifies a set of destinations for the multi-destination packet.

Next, the portlist and the port order list are used to determine which VOQ to insert the multi-destination packet into next. For example, this can involve reading through the ports in the port order list and examining the corresponding bits in the portlist of the multi-destination packet. If a bit is not set, the system goes on to the next port in the port order list. On the other hand, if a bit is set, the multi-destination packet is inserted into the corresponding VOQ. Next, after the multi-destination packet is read from the VOQ and is sent to the corresponding output port, the bit is cleared from the portlist. If the resulting portlist contains all zeros, which indicates that the multi-destination packet has been sent to all of its destinations, the packet is marked for deletion from the VOQ and the buffers are freed. (This freeing process also results in credit release on the packet's source virtual link.)

On the other hand, if the resulting portlist is not all zeros, which indicates that some destinations still remain, the packet is scheduled for the next VOQ. When the multi-destination packet is moved into the next VOQ, the updated portlist is written back to the multi-destination packet's context so it can be used to schedule the packet to its next destination. This process is repeated until all the output ports from the original portlist are served.

The ordering specified in the port order list can be determined based on a number of different policies, such as (1) a congestion-based ordering policy, (2) a fullness-based ordering policy, and (3) a static ordering policy.

For example, a congestion-based ordering policy can be implemented as follows. When a multi-destination packet moves into the head of each VOQ, a timer is started, wherein the timer is stopped and reset whenever that packet moves to the output port. This timer keeps track of how long the packet has been at the head of the queue waiting for the output to be scheduled. (Note that if the timer value crosses a certain preset threshold, this could indicate potential congestion at the output port.) The congestion-based ordering technique sorts the current timer values for the VOQs from low to high, and then loads up the port order list with corresponding port numbers. In this way, the least-congested ports will be at the top of the port order list and the most-congested ports will be at the bottom of the port order list.

A fullness-based ordering policy can be implemented as follows. As a packet moves into each VOQ, a counter is incremented. Similarly, when a packet is moved out of a VOQ, the counter is decremented. This counter represents the buffer occupancy for the VOQ. Moreover, the sum of all VOQ buffer occupancies to a given output port represents the total buffer occupancy for the output port. A fullness-based ordering technique can operate by sorting the buffer occupancy values for the VOQs from low to high and then loading up the port order list with the corresponding port numbers. In this way, the least-occupied ports will be at the top of the port order list and the most-occupied ports will be at the bottom of the port order list. In both of the above-described techniques, the relative ordering among ports changes dynamically as the network's traffic profile changes, or as each output port's behavior changes.

Finally, a static ordering policy can be implemented by simply loading up the port order list using a static policy that does not change over time. For example, an ordering of the output ports can be determined based on the speed of the output ports. In this case, higher-speed output ports that provide 100G of bandwidth will be ordered first ahead of lower-speed output ports that provide 10G or 1G of bandwidth.

Inserting a Multi-Destination Packet into a VOQ

When a multi-destination packet is inserted into a new VOQ, a number of issues can arise. Inserting the multi-destination packet at the head of the new VOQ can potentially cause packet misordering. This is because the multi-destination packet can potentially be sent to the output queue before a preceding packet (which was received before the multi-destination packet) is sent to the output queue.

On the other hand, inserting the multi-destination packet at the tail of the new VOQ can cause blocking behavior. This is because a new packet might be in the process of being received from the network, and a portion of this new packet might be present at the tail of the destination VOQ at the time of insertion of the multi-destination packet. If the system waits for the entire new packet to be received before inserting the multi-destination packet at the end of the VOQ, blocking behavior has occurred.

To prevent the above-described issues from arising, when a multi-destination packet is scheduled to move to a new VOQ, the multi-destination packet is inserted at the end of the last complete packet—rather than waiting to insert the multi-destination packet at the tail of the VOQ when a new packet is being received by the VOQ. This prevents blocking behavior on the input side of the VOQ because the insertion of the multi-destination packet does not interfere with a new packet being received by the VOQ. It also prevents packet misordering because the multi-destination packet is not being inserted at the head of the VOQ.

Figure 5:
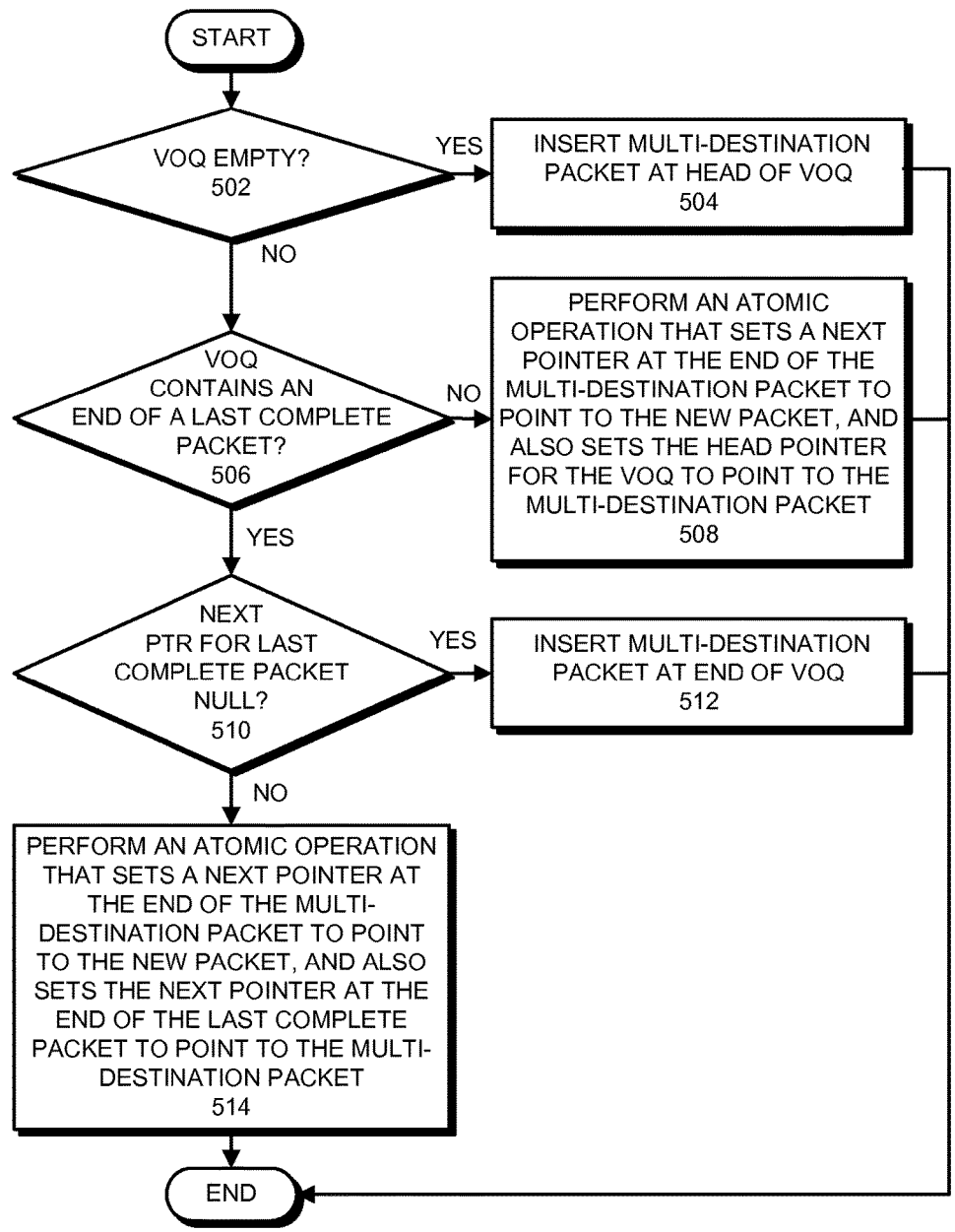
FIG. 5 presents a flow chart illustrating how a multi-destination packet is inserted into a VOQ in accordance with the disclosed embodiments.

More specifically, the process of inserting the multi-destination packet at the end of the last complete packet is illustrated in the flow chart that appears in FIG. 5. First, the system determines whether the VOQ is empty (step 502). This can involve examining the head pointer 301 for the VOQ to see whether the head pointer 301 contains a NULL value. If the VOQ is empty (YES at step 502), the system inserts the multi-destination packet at a head of the VOQ (step 504). On the other hand, if the VOQ is not empty (NO at step 502), the system determines whether the VOQ contains an end of a last complete packet (step 506). This can involve examining the last-complete-packet pointer 302 for the VOQ to see whether the last-complete-packet pointer 302 contains a NULL value.

If the VOQ does NOT contain an end of a last complete packet received by the VOQ (NO at step 506), the system performs an atomic operation to insert the multi-destination packet at a head of the VOQ, wherein the atomic operation sets a next pointer at the end of the multi-destination packet to point to the new packet, and also sets the head pointer for the VOQ to point to the multi-destination packet (step 508). The fact that the VOQ is not empty and does not contain an end of a last complete packet indicates that the VOQ contains a portion of a new incoming packet. (Note that the VOQ cannot contain a portion of an outgoing packet, because the system is configured to complete processing of all outgoing packets before attempting to insert a multi-destination packet into the VOQ.)

On the other hand, if the VOQ contains an end of a last complete packet received by the VOQ (YES at step 506), the system determines whether a next pointer at the last of the last complete packet is NULL (step 510). If so (YES at step 510), this indicates that there is no new partial incoming packet at the tail of the VOQ. In this case, the system inserts the multi-destination packet at the end of the last complete packet in the VOQ (step 512).

On the other hand, if the next pointer is not NULL, which indicates that the end of the last complete packet points to a new packet, the system performs an atomic operation that sets a next pointer at the end of the multi-destination packet to point to the new packet, and also sets the next pointer at the end of the last complete packet to point to the multi-destination packet (step 514). This atomic operation is illustrated in FIG. 3 that shows how multi-destination packet 307 is inserted at the end of the last complete packet 306 in VOQ 201.

The detailed description that appears above is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored on a non-transitory computer-readable storage medium as described above. When a system reads and executes the code and/or data stored on the non-transitory computer-readable storage medium, the system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Moreover, the foregoing descriptions of disclosed embodiments have been presented only for purposes of illustration and description. They are not intended to be exhaustive or to limit the disclosed embodiments to the forms disclosed. Accordingly, many modifications and variations will be apparent to practitioners skilled in the art. Additionally, the above disclosure is not intended to limit the disclosed embodiments. The scope of the disclosed embodiments is defined by the appended claims.

What is claimed is:

1. A method for communicating a multi-destination packet through a network switch fabric with a plurality of input and output ports, comprising: receiving the multi-destination packet at an input port of the network switch fabric, wherein the multi-destination packet includes a multicast packet or a broadcast packet that is directed to multiple output ports, and wherein the network switch fabric has a virtual output queue (VOQ) architecture, wherein each input port maintains a separate VOQ for each output port; and sending the multi-destination packet from the input port to the multiple output ports by inserting the multi-destination packet into VOQs associated with the multiple output ports, wherein the multi-destination packet is inserted into the VOQs based on an ordering of the VOQs that is specified by a port order list maintained in the input port, wherein the multi-destination packet includes a portlist comprising a bit vector having a bit for each output port, wherein a bit that is set in the portlist indicates that the multi-destination packet still needs to be inserted into a VOQ for an output port; wherein while inserting the multi-destination packet in each of the VOQs, if a VOQ contains an end of a last complete packet received by the VOQ, the method comprises inserting the multi-destination packet into the VOQ at the end of the last complete packet.

2. The method of claim 1, wherein inserting the multi-destination packet at the end of the last complete packet involves:
examining a next pointer at an end of the last complete packet;
if the next pointer is NULL, which indicates that the end of the last complete packet is also at an end of the VOQ, inserting the multi-destination packet at the end of the VOQ; and
if the next pointer is not NULL, which indicates that the end of the last complete packet points to a new packet, performing an atomic operation that sets a next pointer at the end of the multi-destination packet to point to the new packet, and also sets the next pointer at the end of the last complete packet to point to the multi-destination packet.

3. The method of claim 1, wherein while inserting the multi-destination packet in each of the VOQs, if a VOQ is empty, the method further comprises inserting the multi-destination packet at a head of the VOQ.

4. The method of claim 1,
wherein the input port includes a memory for storing buffers for VOQs;
wherein each buffer contains a portion of a packet or an entire packet; and
wherein each buffer includes a next pointer that points to either a next buffer in a packet or a next packet in the VOQ.

5. The method of claim 4,
wherein buffers are allocated from the memory to VOQs as needed; and
wherein buffers are freed from VOQs when they are no longer needed.

6. The method of claim 1, wherein each VOQ includes:
a head pointer that points to a first buffer located at a head of the VOQ, wherein the first buffer is next to be sent to the output queue;
a tail pointer that points to a last buffer located at a tail of the VOQ, wherein the last buffer is the last buffer to be added to the VOQ; and
a last complete packet pointer that points to the end of the last complete packet received by the VOQ.

7. The method of claim 1, wherein the multi-destination packet is inserted into one VOQ at a time, so that after the multi-destination packet is read out of a VOQ and is sent to a corresponding output port, the multi-destination packet is inserted in another VOQ until the multi-destination packet is sent to all of the multiple output ports.

8. A non-transitory computer-readable storage medium storing instructions that when executed by a computer cause the computer to perform a method for communicating a multi-destination packet through a network switch fabric with a plurality of input and output ports, the method comprising: receiving the multi-destination packet at an input port of the network switch fabric, wherein the multi-destination packet includes a multicast packet or a broadcast packet that is directed to multiple output ports, and wherein the network switch fabric has a virtual output queue (VOQ) architecture, wherein each input port maintains a separate VOQ for each output port; and sending the multi-destination packet from the input port to the multiple output ports by inserting the multi-destination packet into VOQs associated with the multiple output ports, wherein the multi-destination packet is inserted into the VOQs based on an ordering of the VOQs that is specified by a port order list maintained in the input port, wherein the multi-destination packet includes a portlist comprising a bit vector having a bit for each output port, wherein a bit that is set in the portlist indicates that the multi-destination packet still needs to be inserted into a VOQ for an output port; wherein while inserting the multi-destination packet in each of the VOQs, if a VOQ contains an end of a last complete packet received by the VOQ, the method comprises inserting the multi-destination packet into the VOQ at the end of the last complete packet.

9. The non-transitory computer-readable storage medium of claim 8, wherein inserting the multi-destination packet at the end of the last complete packet involves:
examining a next pointer at an end of the last complete packet;
if the next pointer is NULL, which indicates that the end of the last complete packet is also at an end of the VOQ, inserting the multi-destination packet at the end of the VOQ; and
if the next pointer is not NULL, which indicates that the end of the last complete packet points to a new packet, performing an atomic operation that sets a next pointer at the end of the multi-destination packet to point to the new packet, and also sets the next pointer at the end of the last complete packet to point to the multi-destination packet.

10. The non-transitory computer-readable storage medium of claim 8, wherein while inserting the multi-destination packet in each of the VOQs, if a VOQ is empty, the method further comprises inserting the multi-destination packet at a head of the VOQ.

11. The non-transitory computer-readable storage medium of claim 8,
wherein the input port includes a memory for storing buffers for VOQs;
wherein each buffer contains a portion of a packet or an entire packet; and
wherein each buffer includes a next pointer that points to either a next buffer in a packet or a next packet in the VOQ.

12. The non-transitory computer-readable storage medium of claim 11,
wherein buffers are allocated from the memory to VOQs as needed; and
wherein buffers are freed from VOQs when they are no longer needed.

13. The non-transitory computer-readable storage medium of claim 8, wherein each VOQ includes:
a head pointer that points to a first buffer located at a head of the VOQ, wherein the first buffer is next to be sent to the output queue;
a tail pointer that points to a last buffer located at a tail of the VOQ, wherein the last buffer is the last buffer to be added to the VOQ; and
a last complete packet pointer that points to the end of the last complete packet received by the VOQ.

14. The non-transitory computer-readable storage medium of claim 8, wherein the multi-destination packet is inserted into one VOQ at a time, so that after the multi-destination packet is read out of a VOQ and is sent to a corresponding output port, the multi-destination packet is inserted in another VOQ until the multi-destination packet is sent to all of the multiple output ports.

15. A system that communicates a multi-destination packet, comprising: a network switch fabric with a plurality of input and output ports; wherein the network switch fabric has a virtual output queue (VOQ) architecture, wherein each input port maintains a separate VOQ for each output port; and wherein each input port in the network switch fabric is configured to: receive a multi-destination packet, wherein the multi-destination packet includes a multicast packet or a broadcast packet that is directed to multiple output ports; and send the multi-destination packet from the input port to the multiple output ports by inserting the multi-destination packet into VOQs associated with the multiple output ports, wherein the multi-destination packet is inserted into the VOQs based on an ordering of the VOQs that is specified by a port order list maintained in the input port, wherein the multi-destination packet includes a portlist comprising a bit vector having a bit for each output port, wherein a bit that is set in the portlist indicates that the multi-destination packet still needs to be inserted into a VOQ for an output port; wherein while inserting the multi-destination packet in each of the VOQs, if a VOQ contains an end of a last complete packet received by the VOQ, the input port is configured to insert the multi-destination packet into the VOQ at the end of the last complete packet.

16. The system of claim 15, wherein while inserting the multi-destination packet at the end of the last complete packet, the input port is configured to:
examine a next pointer at an end of the last complete packet;
if the next pointer is NULL, which indicates that the end of the last complete packet is also at an end of the VOQ, insert the multi-destination packet at the end of the VOQ; and
if the next pointer is not NULL, which indicates that the end of the last complete packet points to a new packet, perform an atomic operation that sets a next pointer at the end of the multi-destination packet to point to the new packet, and also sets the next pointer at the end of the last complete packet to point to the multi-destination packet.

17. The system of claim 15, wherein while inserting the multi-destination packet in each of the VOQs, if a VOQ is empty, the input port is configured to insert the multi-destination packet at a head of the VOQ.

18. The system of claim 15,
wherein the input port includes a memory for storing buffers for VOQs;
wherein each buffer contains a portion of a packet or an entire packet; and
wherein each buffer includes a next pointer that points to either a next buffer in a packet or a next packet in the VOQ.

19. The system of claim 18,
wherein buffers are allocated from the memory to VOQs as needed; and
wherein buffers are freed from VOQs when they are no longer needed.

20. The system of claim 15, wherein each VOQ includes:
a head pointer that points to a first buffer located at a head of the VOQ, wherein the first buffer is next to be sent to the output queue;
a tail pointer that points to a last buffer located at a tail of the VOQ, wherein the last buffer is the last buffer to be added to the VOQ; and
a last complete packet pointer that points to the end of the last complete packet received by the VOQ.

21. The system of claim 15, wherein the input port is configured to insert the multi-destination packet one VOQ at a time, so that after the multi-destination packet is read out of a VOQ and is sent to a corresponding output port, the multi-destination packet is inserted in another VOQ until the multi-destination packet is sent to all of the multiple output ports.

* * * * *